United States Patent [19]

Sasaki

[11] Patent Number: 5,193,222
[45] Date of Patent: Mar. 9, 1993

[54] SYSTEM FOR INTERRUPTING A TRANSMITTER OUTPUT WAVE

[75] Inventor: Susumu Sasaki, Fujisawa, Japan
[73] Assignee: Fujitsu Limited, Kawasaki, Japan
[21] Appl. No.: 522,096
[22] Filed: May 11, 1990
[30] Foreign Application Priority Data
 May 12, 1989 [JP] Japan ................... 1-117444
[51] Int. Cl.⁵ ............... H04B 1/02; H01Q 11/12
[52] U.S. Cl. .................... 455/102; 455/103; 455/116
[58] Field of Search ............ 455/102, 101, 103, 116, 455/93, 105, 108

[56] References Cited

U.S. PATENT DOCUMENTS 4,259,742 5/1981 Burns et al. ................... 455/101

FOREIGN PATENT DOCUMENTS 0242734 12/1985 Japan ......................... 455/103

Primary Examiner—Reinhard J. Eisenzopf
Assistant Examiner—Christine Belzer
Attorney, Agent, or Firm—Staas & Halsey

[57] ABSTRACT

In a transmitter, a modulator switchably operates on one of two modes of operations, that is, in a first mode of the operation, such as an offset QPSK, FSK or π/4 shift QPSK, an amplitude of an output signal of the modulator does not become zero at any instant, and in a second mode of the operation, such as two-phase FSK or four-phase PSK, the output signal of the modulator is 100% amplitude-modulated or 180 phase-modulated. Second mode operation. The operation mode is switched by changing the mode of the parallel input signals to the modulator, where the parallel signals have been converted from a serial input data signal to be transmitted. After the first mode operation is switched to the second mode operation the output signal is interrupted preferably on a first moment that the amplitude of the output signal becomes zero, as well as, before the second mode operation is switched to the first mode operation the output signal is resumed preferably on a second moment that the amplitude of the output signal is to become zero. The interruption of the modulated output signal may be done by cutting the local frequency or modulated signal, or by the parallel input signals. Thus, spurious wave is not generated on the transition of interrupting or resuming the modulated transmittal wave, and the period of the interrupting can be short enough.

22 Claims, 14 Drawing Sheets

*FIG. 1*
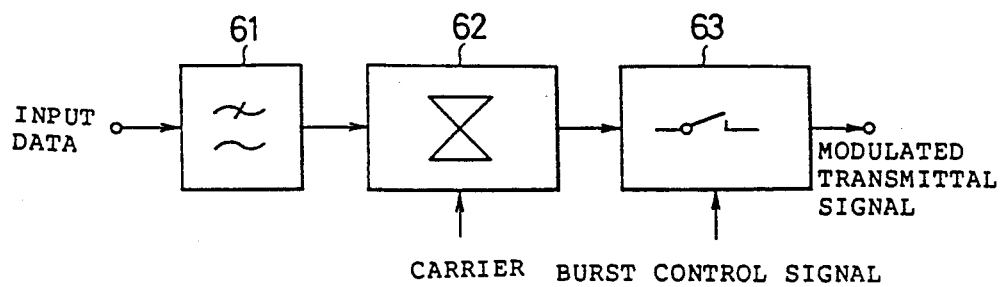
*FIG. 2(a)*
*FIG. 2(b)*
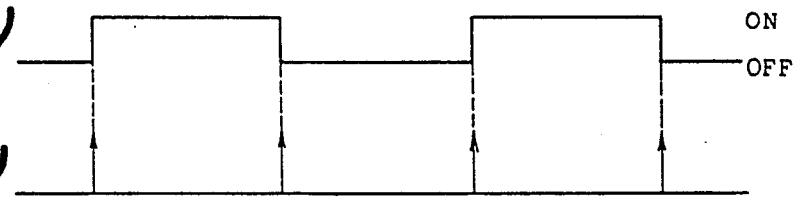
*FIG. 3*
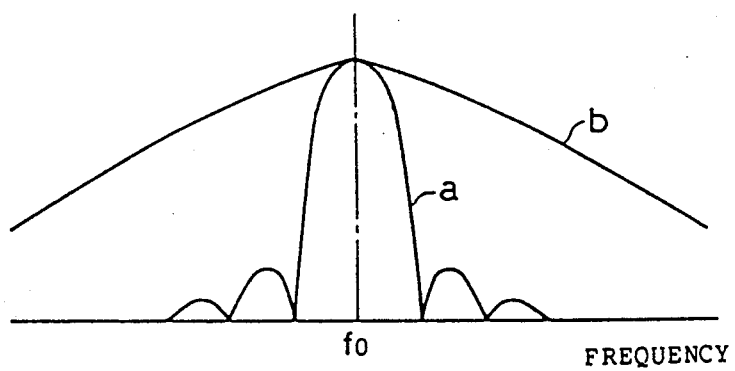

I

Q

MODULATED AND INTERRUPTED TRANSMITTAL SIGNAL

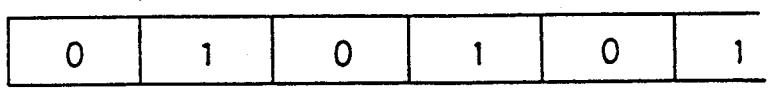
FIG. 12(a)
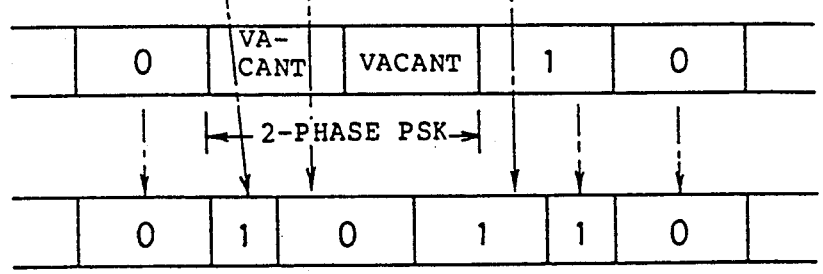
FIG. 12(b)
FIG. 12(c)
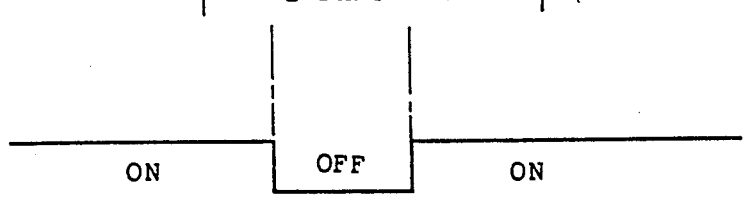
FIG. 12(d)

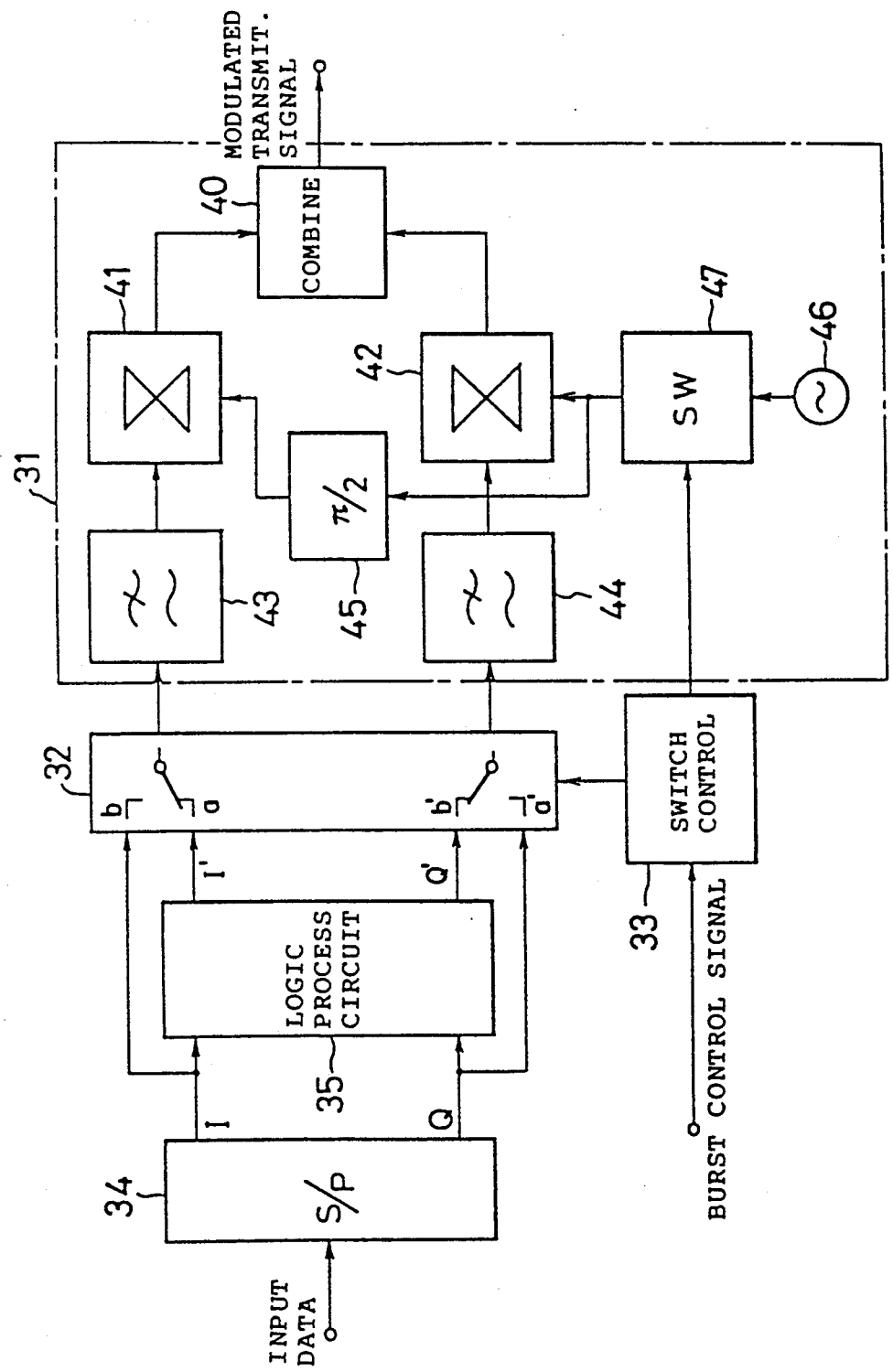

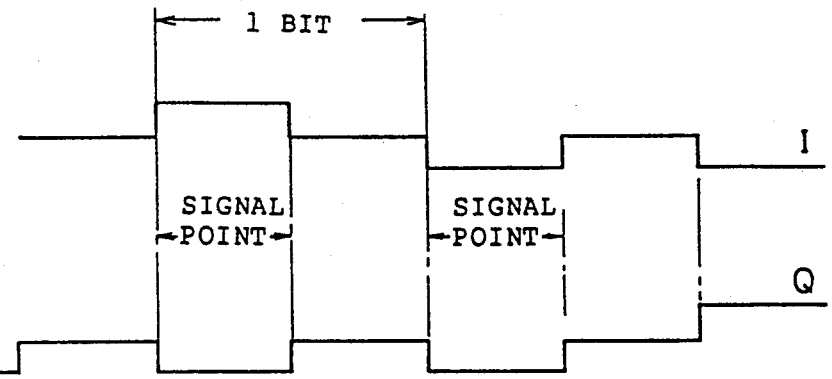
FIG. 18(a)
FIG. 18(b)
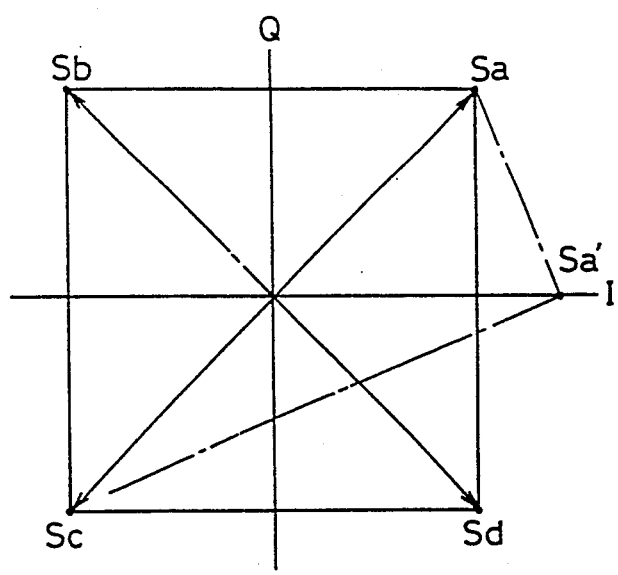
FIG. 19

SYSTEM FOR INTERRUPTING A TRANSMITTER OUTPUT WAVE

BACKGROUND OF THE INVENTION

1. Field of the Invention

The present invention relates to a modulator circuit which suppresses generation of spurious frequency spectrum produced while controlling ON and OFF of the modulated transmittal wave.

2. Description of the Related Art

In a time division communication system or a frequency division communication system in mobile communication, a system which transmits the signal only when a voice signal is present has been known. In view of simplifying the control of transmitter in such system or a time division communication system, a system for controlling ON and OFF of the modulated output wave with a switch circuit has been used. In this case, however, momentary transition of ON and OFF of the modulated output signal generates spurious frequency spectrum. A burst control signal of this case is shown in FIG. 2(a), and a spurious pulse frequency generated in the transmittal output signal is shown in FIG. 2(b). Since the communication systems may be interfered by this spurious frequency, it is essential to suppress generation of this spurious frequency spectrum.

As a method of suppressing such spurious frequency spectrum, as shown in FIG. 1, a carrier is modulated in the modulator 62 by an input pulse signal whose frequency band is limited to the base band frequency by a low-pass filter 61, and the modulated signal is interrupted by a switch circuit 63 controlled by the burst control signal conforming to the allocated time so as to generate a transmittal signal burst. It is also possible to interrupt the carrier input to the modulator 62 according to the burst control signal, in stead of using the switch 63. In this circuit structure, the spurious generated on the transition is reduced by slowing the transition of individual input pulses, resulting in reduced spurious wave generation in the vicinity of carrier frequency. However, in any case, spurious frequency spectrum is still generated in the transmittal frequency band momentarily on the ON/OFF transitions of the transmittal signal.

The spectrum in the transmittal frequency band generated by the input signal pulses is attenuated typically conforming to the curve of $S(f)=(\sin x/x)^2$ around the carrier frequency $f_o$ as shown by "a" in FIG. 3. The spurious frequency spectrum generated on ON/OFF transitions of modulated transmittal signal includes a wide frequency component as shown by "b". Therefore, it causes a serious interference in the other communication systems.

In order to eliminate such spurious frequency spectrum, a band-pass filter 64, for example, has been employed in the prior art in the successive stage of switch 63 as shown in FIG. 4, where the parts like those in FIG. 1 are designated by the like numerals. However, even when such band-pass filter 64 is employed, the spurious frequency spectrum in the pass-band of band-pass filter 64 cannot be eliminated. Moreover, in a mobile communication system, a comparatively low speed data is generally transmitted, and therefore a narrow band-pass filter 64 is used, and consequently there is a problem in that an insertion loss becomes large even though the spurious frequency spectrum outside the pass-band can be eliminated.

The modulator 62 explained above is usually formed with a multi-phase phase-modulator or quadrature amplitude phase modulator. Therefore, the modulated signal includes a large change in its amplitude, in other words fluctuating envelope. Accordingly, there is a moment that the envelope becomes zero, and there has been proposed a method that the spurious frequency spectrum is suppressed by controlling ON and OFF of the modulated signal on this moment. (For example, the U.S. Pat. No. 4,644,531 proposed by the inventor of the present invention.) In this method, for example, a same sign which is opposite to the sign immediately before the rise of the burst control signal is continuously given to at least two bits immediately after the rise of the burst control signal, and thereafter the signal is inverted. Or, the sign of at least two bits immediately before the fall of the burst control signal is set opposite to the sign of the preceding bits, and the sign is then inverted immediately after the fall of the burst control signal. Thereby, the signal is controlled ON and OFF at the moment at which the amplitude of the modulated signal becomes zero, and the spread of the spurious frequency band generated thereby can be reduced.

Meanwhile, since the modulated signal whose amplitude does not become zero receives less influence of nonlinearity distortion of the amplifier, the amplifier can be simply structured as well as reduced power consumption can be realized. Accordingly, this method provides a merit of realizing reduction in size of a mobile station in the mobile communication system, and is preferably employed. An example circuit is hereunder explained.

FIG. 5 is a block diagram of an offset 4-phase PSK (Phase Shift Keying) modulation circuit of a prior art. In this figure, numeral 71 designates a 4-phase phase-modulation circuit; 72, a phase shifter for delaying an input signal pulse for a ½ bit period; 73, a serial/parallel converting circuit; 74 and 75, low-pass filters; 76 and 77, modulator units each formed with, for example, a balanced mixer; 78, a combiner; 79, a phase shifter for shifting the carrier for $\pi/2$; 80, a carrier oscillator; and 81, a switch.

An input data is converted to parallel data I and Q by serial/parallel converter 73, and the Q channel output data is shifted for ½ bit by phase-shifter 72. The switch 81 is controlled by a burst control signal and thereby the carrier applied to the modulator units 76 and 77 is controlled ON and OFF. When the switch 81 becomes conductive, the carrier from the carrier generator 80 is applied to the modulator units 76 and 77; and the modulated signals, as the respective outputs, are summed in the combiner 78 to become a transmittal signal. When the switch 81 opens, the transmittal signal is cut. FIG. 6(a) and FIG. 6(b) respectively show modulating signals input to the modulator units 76 and 77 through the low-pass filters 74 and 75 of the I channel and Q channel. Since these signals are shifted by ½ bit period with each other, the transmittal signal combined by the combiner unit 78 is shown in FIG. 6(c). Namely, the modulated transmittal signal has a small change in amplitude and does not include any moment at which the amplitude becomes zero.

FIG. 7 is a block diagram of an FSK (Frequency Shift Keying) circuit of the prior art. Numerals 84 and 85 designate low-pass filters; 86 and 87, modulator units each formed, for example, with a balanced mixer; 88, a combiner; 89, a π/2 phase-shifter; 90, a carrier oscillator; 91, a switch; 92, a serial/parallel converting circuit; 93, an quadrature amplitude phase modulation circuit; and 94, a logic processing circuit.

An input data is converted to parallel data I and Q by the serial/parallel converting circuit 92, applied to the logic processing circuit 94, and then converted to phase-component signals cos φ and sin φ. These phase-component signals cos φ and sin φ are applied to the modulator unit 93 so as to be quadrature-modulated. Thereby, an FSK-modulated signal is output.

A π/4-shift QPSK (Quadrature Phase Shift Keying) signal can be obtained by providing a mapping circuit (not shown in the figure) in place of the logic processing circuit 94, thus, after being logic-processed without changing the phase by 180 degrees the data is input to the modulator unit 93. The amplitude of thus modulated signal does not become zero. Therefore, the ON/OFF control of the modulated output signal by these modulation systems causes the following problems. Namely, as described above, the phase-modulated signal and quadrature amplitude phase modulated signal, each of which largely changes the envelope of the modulated signal on the transition of input signal, can be made zero in the amplitude, on ON/OFF of the modulated signal by logical processing of the input pulse signal, accordingly generation of spurious frequency spectrum can be suppressed. However, as mentioned above, in the modulation circuit shown in FIG. 5 or FIG. 7, since the modulated signal output has no moment at which the envelope becomes zero, it is inevitable that the widely spreading spurious frequency spectrum is generated by the ON/OFF transitions of modulated signal.

In order to eliminate such disadvantage, it has been proposed that the input data is previously grouped as a burst, namely as a group of pulse train, transitions of leading edge and trailing edge are dulled by a filter. However, in such a communication system that requires a sufficient time is between the burst periods, the ON/OFF control can be carried out during the pause period between the bursts. But, since the pause period becomes longer and thereby transmission efficiency is lowered, such a method is often difficult to be applied to the mobile communication system.

SUMMARY OF THE INVENTION

It is a general object of the present invention to provide circuit configurations and methods which allow interruption and resume of a phase-modulated or frequency-modulated transmittal wave, without emitting spurious frequency spectrum at the transitions of interrupting and resuming the transmittal wave.

It is another object of the present invention to provide circuit configurations and methods which allow a shortest guard period between the bursts.

A transmitter according to the present invention, a modulator switchably operates on two modes of operations depending on types of input parallel signals thereto, that is, in a first mode of the operation, such as an offset QPSK or FSK, where an amplitude of the output signal of the modulator does not become zero at any instant, and in a second mode of the operation, such as two-phase FSK or four-phase PSK, where the output signal of the modulator is 100% amplitude-modulated or 180 degree phase-modulated. The switching of the operation modes is carried out by changing the types of the input parallel signals converted from the input serial data. After the first mode operation is switched to the second mode operation, the output signal is interrupted preferably on a first moment that the amplitude of the output signal becomes zero, as well as, before the second mode operation is switched to the first mode operation the output signal is resumed preferably on a second moment that the amplitude of the output signal is to become zero.

The above-mentioned features and advantages of the present invention, together with other objects and advantages, which will become apparent, will be more fully described hereinafter, with reference being made to the accompanying drawings which form a part hereof, wherein like numerals refer to like parts throughout.

BRIEF DESCRIPTION OF THE DRAWINGS

FIG. 1 shows a partial block diagram of a prior art circuit configuration of a transmitter;

FIGS. 2A and 2B show generation of spurious waves on ON/OFF of transmittal signal;

FIG. 3 shows frequency spectrum output from the prior art transmitter;

FIGS. 12A, 12B, 12C and 12D show a guard period in the first and second preferred embodiments of the present invention;

FIG. 13 shows a block diagram of a third preferred embodiment of the present invention for operating on the FSK;

FIGS. 18A and 18B show a time relation of outputs from a mapping circuit;

FIG. 19 shows an explanation of signal points of the π/4 shift quadrature PSK.

DESCRIPTION OF THE PREFERRED EMBODIMENTS

Figure 8:
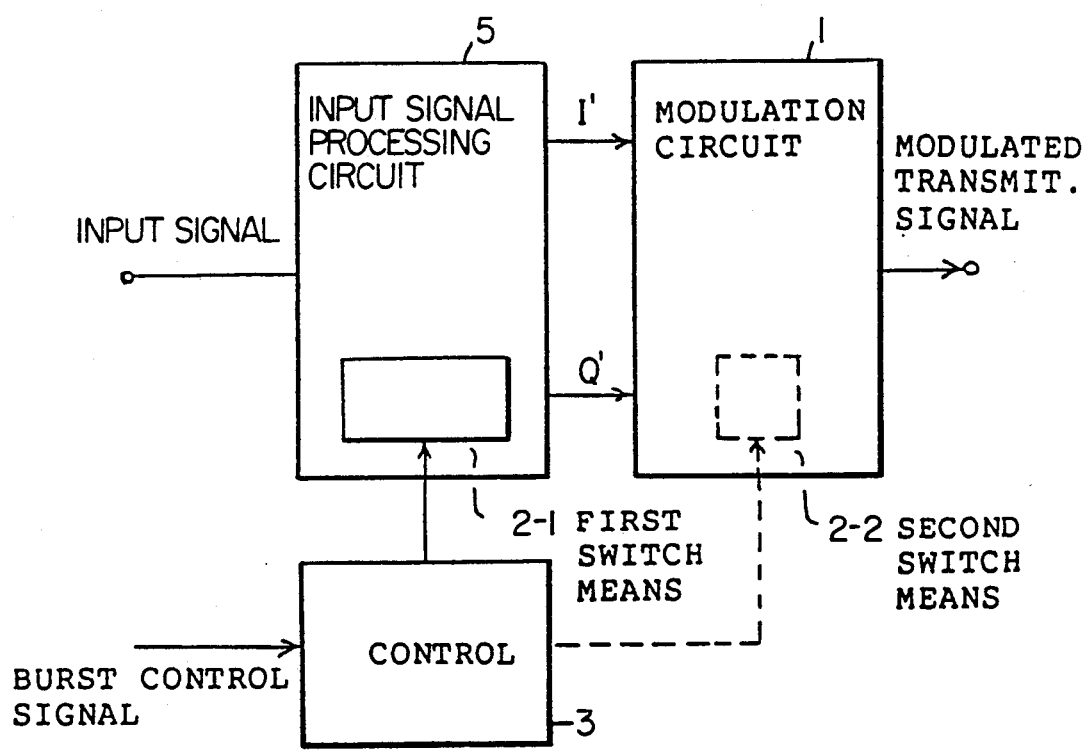
FIG. 8 shows a principle block diagram of the present invention.

FIG. 8 is a principle block diagram of the present invention. An input signal, which is a serial baseband signal, is converted to parallel data by an input signal processing circuit 5 and is then input, as signals I' and Q', to a modulating circuit 1 after being data-processed therein corresponding to the required type of the modulation. The modulating circuit 1 is a widely used quadrature amplitude phase modulation circuit and can selectively conduct a first mode modulating operation, for example, an offset QPSK or FSK in which the amplitude does not become zero in any moment, or a second mode modulating operation, for example, a 2-phase FSK or 4-phase PSK in which the amplitude becomes zero in a certain moment, depending on the type of the input data I' and Q'. The input signal processing circuit 5 further comprises first switch means 2-1 for switching the type of the input data, I' and Q', for the two types of modulation modes depending on the instruction of controller 3. Functions of the switch means 2-1 are as follow:

(a) The signals I' and Q' or the either one is switched so that an output of the modulating circuit 1 is 100% amplitude-modulated or the phase is modulated in 180 degrees inversion, and as a result the amplitude modulation having a moment at which the amplitude becomes zero is carried out.

(b) In case the modulation unit of modulating circuit 1 (21 and 22, or 41 and 42 described later) is a cosine type (balanced type diode mixer, etc.), a zero output (for example, grounded) of signal I' or Q' makes the output of the modulation unit zero.

(c) In stead of the signal I' or Q' being not input from the input signal processing circuit 5, an output of the modulation unit is set to zero or phase-inverted by opening the input terminal or inputting a predetermined voltage thereto. This switch means 5 is embodied with a simple switch or a wired logic circuit.

The modulated transmittal signal from the modulating circuit 1 is ON/OFF-controlled depending on the instruction of controller 3 by second switch means 2-1, by the use of the function of first switch means 2-1 or by second switch means 2-2 which cuts off an output of the local oscillator or the modulated transmittal signal of the modulating circuit 1.

Interruption of this modulated transmittal signal is preferably switched in such a moment that the amplitude is essentially zero, after the modulated transmittal signal is switched to the second modulation mode from the first modulation mode by the first switch means 2-1. Moreover, after the modulated transmittal signal of the second modulation mode is resumed by the second switch means 2-2 on such a moment that the amplitude of the modulated transmittal signal becomes zero, the first modulation mode is resumed by the first switch means 2-1.

At first, an input method for the offset 4-phase PSK is described below as a first preferred embodiment and those of the other modulation methods are explained as a second and successive preferred embodiments.

Figure 9:
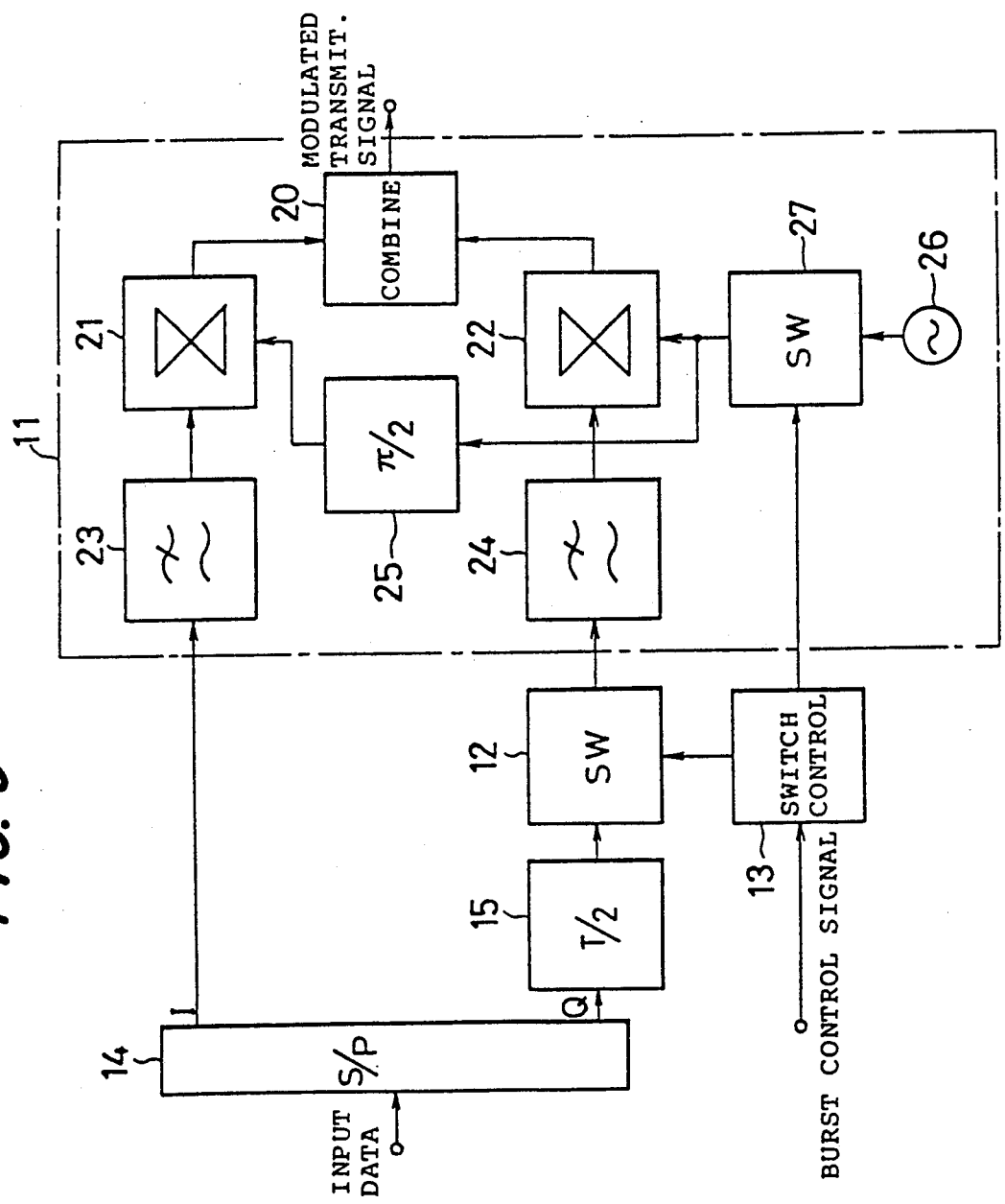
FIG. 9 shows a block diagram of a first preferred embodiment of the present invention for operating on the offset four-phase PSK.
Figure 10A:
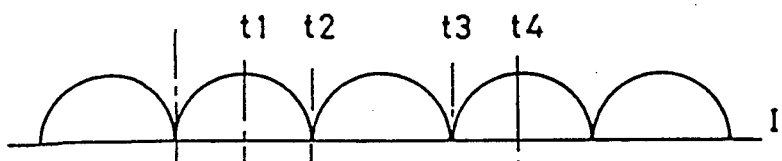
FIGS. 10A, 10B, 10C, 10D, 10E, and 10F show waveforms in the first preferred embodiment shown in FIG. 9.
Figure 10B:
Figure 10C:
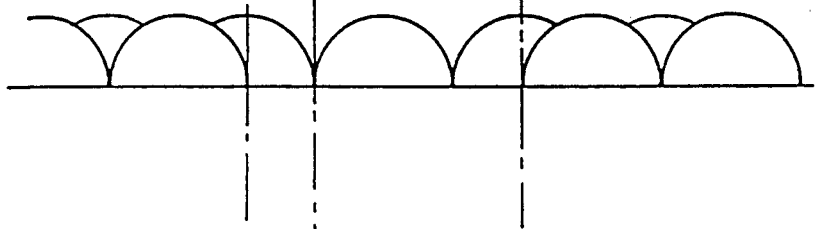
Figure 10D:
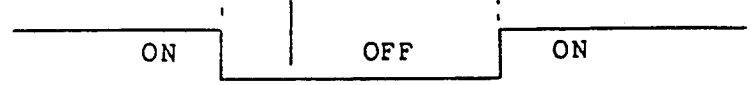
Figure 10E:
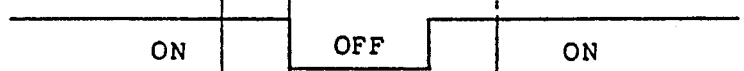
Figure 10F:
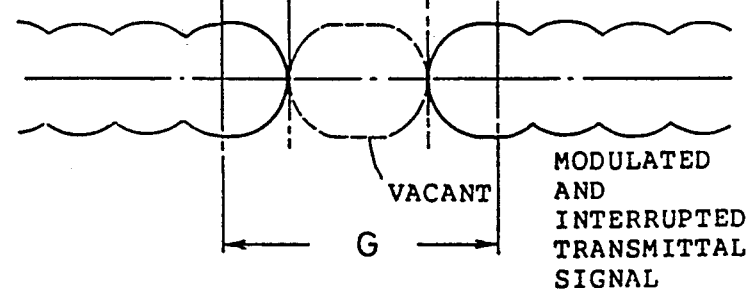

FIG. 9 is a block diagram of the first preferred embodiment of the present invention in which a signal modulated by the offset 4-phase PSK is transmitted. In this figure, the numeral 11 designates a modulating circuit; 12, a first switch; 13, a switch control circuit; 14, a serial/parallel converting circuit; 15, a shift circuit; 20, a combiner; 21 and 22, modulator units each formed, for example, with a well-known balanced mixer; 23 and 24, low-pass filters; 25, a phase shifter; 26, a carrier oscillator; and 27, a second switch.

Figure 4:
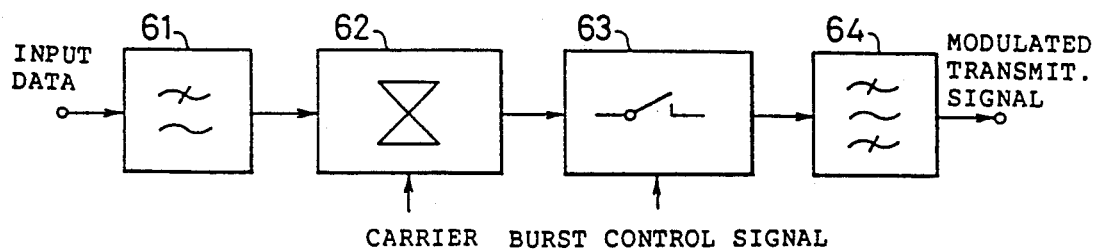
FIG. 4 a partial block diagram of another prior art circuit configuration of a transmitter.
Figure 5:
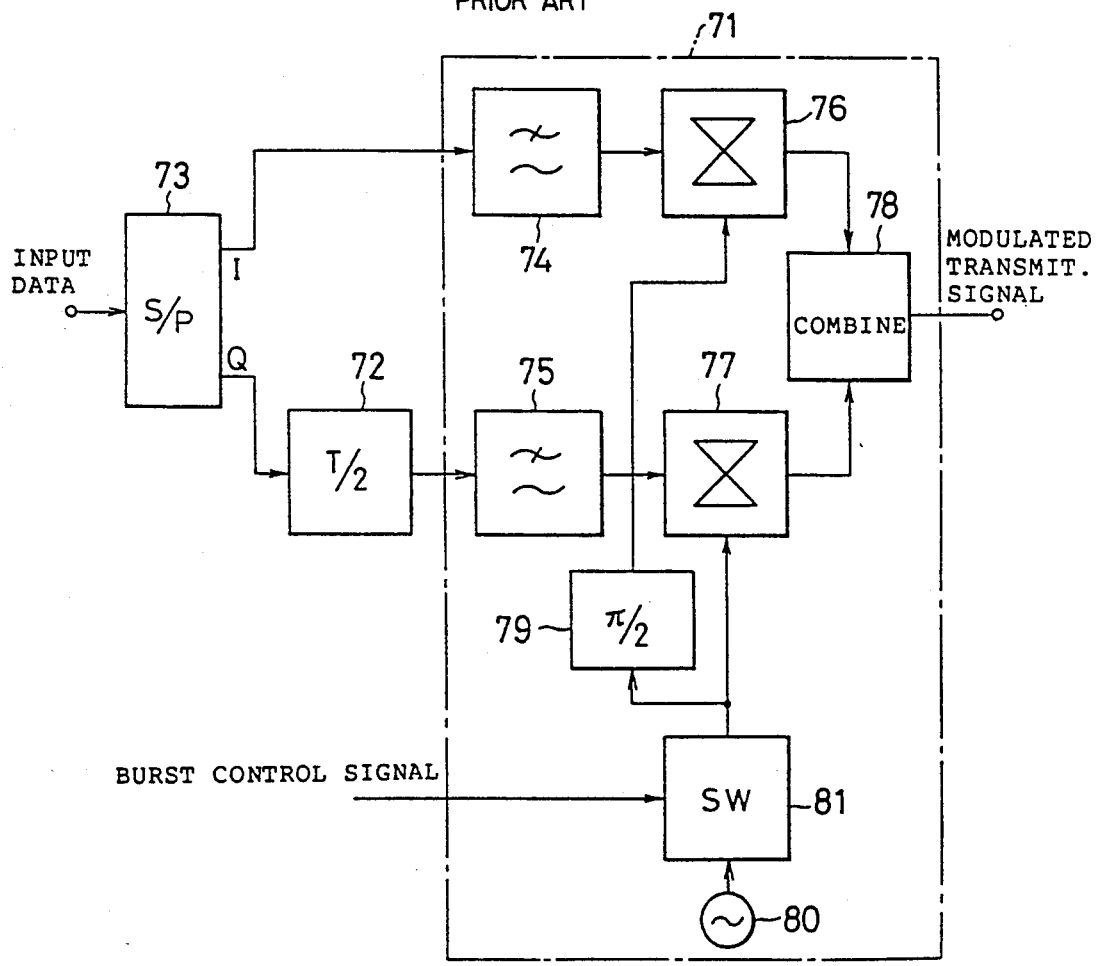
FIG. 5 shows a block diagram of a prior art circuit configuration for an offset four-phase PSK.
Figure 6A:
FIGS. 6A, 6B, and 6C show waveforms in an offset four-phase PSK.
Figure 6B:
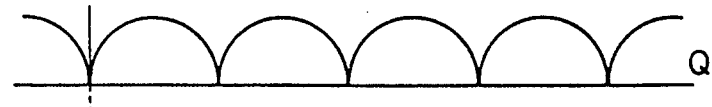
Figure 6C:
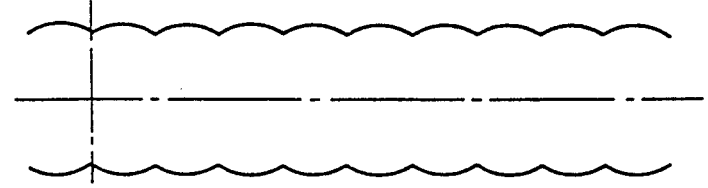

The input data is converted to I and Q channel parallel data by the serial/parallel converting circuit 14. The I channel data is dulled by the low-pass filter 23 and is then applied to the modulator unit 21. The Q channel data is delayed for a ½ bit period by the shift circuit 15, and is applied through switch 12 to the low-pass filter 24, where the pulse shape of data signal is dulled, and is applied to the modulator unit 22. The modulating circuit 11 has substantially the same structure as the 4-phase phase modulating circuit 71 of the prior art shown in FIG. 5. The carrier signal supplied from the carrier oscillator 26 is applied to the phase shifter 25 and concurrently applied to the modulator unit 21 after being delayed by $\pi/2$ by the phase shifter 25. Therefore, the carriers having phase difference of $\pi/2$ are modulated and are summed in the combiner 20 to become a transmittal signal. On the other hand, the modulating signal data to be input to the modulator units 21 and 22 are caused to have a phase difference therebetween by a ½ bit period by the shift circuit 15. As a result, the modulated signal combined by the combiner 20 does not have a moment at which the amplitude, or envelope, becomes zero. For the ON/OFF control of the modulated signal according to a burst control signal input to the switch control circuit 13, at first the switch control circuit 13 opens the first switch 12. Thereby, operation of the modulation circuit 11 is switched from the offset 4-phase QPSK operation to the 2-phase PSK operation. As is well known, the 2-phase PSK signal includes a zero-amplitude moment, because, at the same time its amplitude is 100% amplitude modulated. On the moment at which the amplitude becomes zero, the second switch 27 is turned ON or OFF. For interrupting the modulated signal, the second switch 27 is opened so as to discontinue the carrier signal applied to the modulator units 21 and 22. Thereby, the modulated signal output from the combiner 20 is cut. For resuming the modulated signal, the second switch 27 is closed so as to apply the carrier signal to the modulator units 21 and 22, and respective modulated output signals are summed by the combiner 20 to become the modulated transmittal signal.

FIGS. 10 conceptionally show waveforms for explaining operations of the first preferred embodiment described above. FIG. 10(a) and FIG. 10(b) respectively show the modulated input data to be applied through the I channel and Q channel low-pass filters 23 and 24 to the modulator units 21 and 22. Envelopes of the modulated output signals applied to the combiner 20 from the modulator units 21 and 22, respectively, have a phase difference between each other a half of one bit period of the input data, namely T/2, and as conceptionally shown in FIG. 10(c), there is no moment at which amplitude of the combined modulated signal becomes zero. For turning ON and OFF the modulated signal to be transmitted in accordance with the burst control signal, the control circuit 13 instructs the first switch to open at the time t1 at which the Q channel modulator-input signal becomes zero as shown in FIG. 10(b). Thereby, as indicated by a dotted line of FIG. 10(b), the Q channel becomes vacant, thus the modulated signal output from the combiner unit 20 becomes the 2-phase PSK modulated signal only of the I channel. When the modulation is carried out for the 2-phase PSK in accordance with the input signals "1" and "0" alternately, the amplitude of the modulated signal is modulated by 100%; accordingly, its amplitude becomes zero at the moments t2 and t3. When the second switch 27 is opened at the time t2 at which the amplitude becomes zero as shown in FIG. 10(e), the carrier wave applied to the modulators 21 and 22 from the carrier oscillator is discontinued, thus the modulated transmittal signal is cut. For resuming the burst, at first the second switch 27 is closed at the time t3 at which amplitude of the 2-phase PSK signal becomes zero, so as to apply the carrier to the modulator units 21 and 22 from the carrier oscillator 26. In this case, since the first switch 12 is kept opened, the modulating circuit 11 is conducting the 2-phase PSK operation. Next, at the time t4 at which the Q channel modulator input becomes zero, the first switch 12 is closed so that the modulating circuit 11 returns to the offset 4-phase QPSK operation. Accordingly, the period from time t1 to t4 of the data transmitted is defined as a guard period G as shown with the envelope of the transmittal signal shown in FIG. 10(f). This guard period G can be set as short as about 1-2 bits. At the times t2 and t3, at which the 100% modulated amplitude becomes zero, the spurious frequency spectrum generated on the ON/OFF transitions of the modulated transmittal signal can be suppressed. Though in the first preferred embodiment shown in FIG. 9, the second switch 27 interrupts the carrier wave signal to be input to the modulator units 21 and 22; accordingly, the similar function can be achieved with a structure that the second switch 27 is located (not illustrated) in series to the output of the combiner 20 so as to turn ON and OFF the modulated transmittal output wave.

Figure 11:
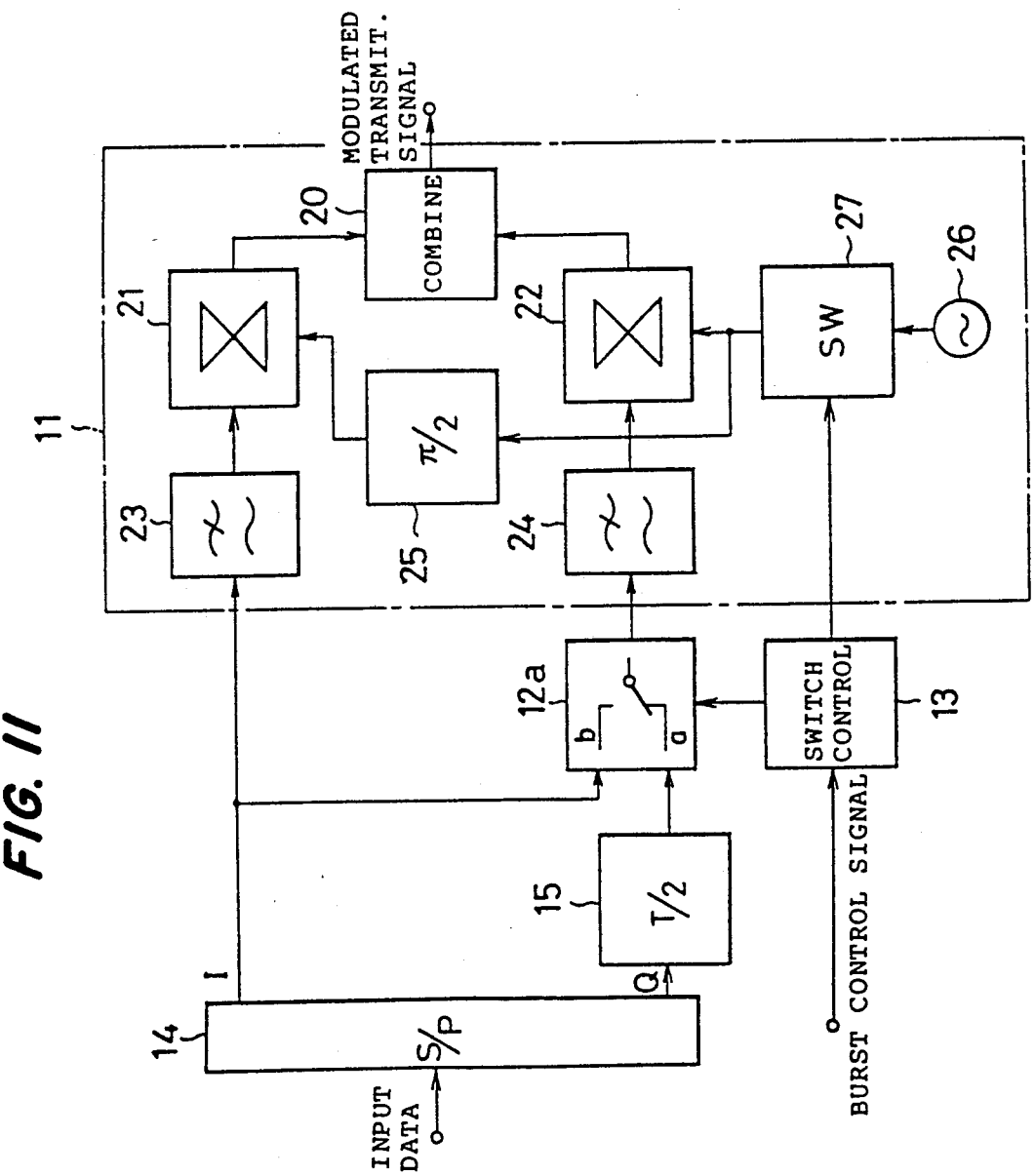
FIG. 11 shows a block diagram of a second preferred embodiment of the present invention for operating on the four-phase PSK.

FIG. 11 is a block diagram of a second preferred embodiment of the present invention. The parts like those in FIG. 9 are designated by the like numerals. Only different in the second embodiment from the first embodiment is that the first switch 12 is replaced with a transfer type switch 12a. Namely, in the first preferred embodiment the Q channel data is disabled by the first switch 12 to realize a 2-phase PSK operation in the modulating circuit 11; however, in the second preferred embodiment, a transfer switch 12a is provided, in place of the ON/OFF switch 12 to apply the I channel data, in stead of the Q channel data shifted by T/2, to the Q channel modulator unit 22. In other words, at the time t1 of FIG. 10, the Q channel data to be input to the modulator unit 22 is switched to the I channel data and it is then returned to the Q channel data at the time t4. Accordingly, the modulated input data of I channel is input to both the modulator units 21 and 22 during the period from time t1 to t4, so as to force the modulating circuit 11 to operate the 2-phase PSK modulation like in the case of the first preferred embodiment. Therefore, the modulated signal, combined by the combiner 20 and then transmitted, is 100% amplitude-modulated by the pulses of "1" and "0". On the times t2, and t3 at which the amplitude becomes zero, the modulated transmittal signal is turned ON and OFF according to ON/OFF of the carrier by the second switch 27, or direct ON/OFF of the transmittal signal output from the combiner unit 20 by a switch which is not shown in the figure.

FIGS. 12 are diagrams for explaining the guard period. FIG. 12(a) indicates I channel data; FIG. 12(b), Q channel data respectively of the first preferred embodiment; FIG. 12(c), Q channel data of the second preferred embodiment; and FIG. 12(d) indicates ON/OFF states of the modulated signal by the second switch 27. Here, a three-bit period of I channel is the guard period between the data bursts. Namely, in the first preferred embodiment, as shown in FIG. 12(b), the two bits of Q channel data are vacant, during which the 2-phase PSK is provided by the I channel data. In the second preferred embodiment, as shown in FIG. 12(c), a 2-phase PSK is carried out by inserting the I channel data in place of the Q channel data. Thus, the modulated signal becomes ON and OFF at the times at which the amplitude becomes zero, as shown in FIG. 12(d).

Figure 7:
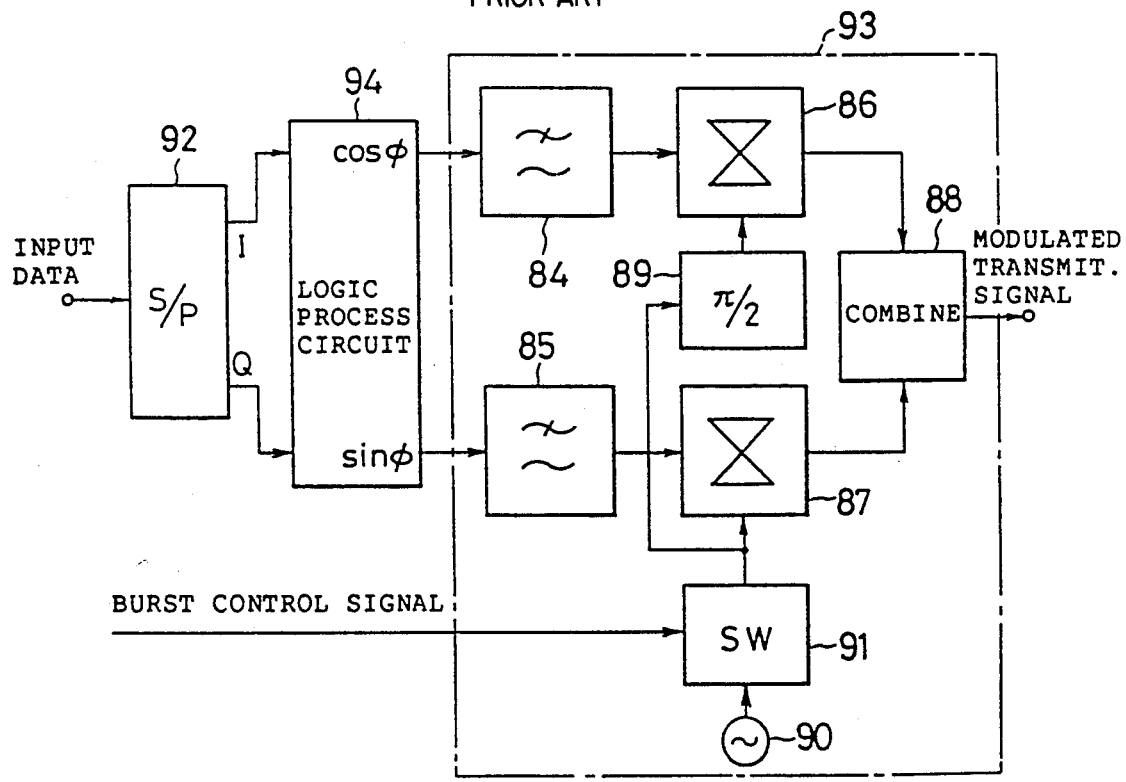
FIG. 7 shows a block diagram of a prior art circuit configuration for an FSK.

FIG. 13 is a block diagram of a third preferred embodiment of the present invention which is applied to an FSK modulating circuit. In this figure, the numeral 31 designates a modulating circuit; 32, a first switch circuit; 33, a control circuit; 34, a serial/parallel converting circuit; 35, a logic processing circuit; 40, a combiner; 41 and 42, modulator units; 43 and 44, low-pass filters; 45, a phase shifter; 46, a carrier oscillator; and 47, a second switch circuit. The modulating circuit 31, serial/parallel converting circuit 34 and logic processing circuit 35 in the third preferred embodiment respectively correspond identically to the modulator 93, serial/parallel converting circuit 92 and logic processing circuit 94 of the prior art FSK modulating circuit shown in FIG. 7. In this third preferred embodiment, the first switch 32 consisting of two transfer switches is additionally connected as shown in FIG. 3. Namely, when contacts "a" and "a'" are selected, the inputs to the low-pass filters 43 and 44 become the I' and Q' channel signals from the serial/parallel converting circuit 34. When the contacts "b" and "b'" are selected, the inputs are switched respectively to the output signals I and Q from the serial/parallel converting circuit 34. When the input to the modulating circuit 31 is connected to the contacts "a" and "a'", the FSK signal by the quadrature modulation is transmitted from the combiner 40 as in the case of the prior art of FIG. 7. This FSK signal does not have a moment at which the amplitude becomes zero. For turning ON and OFF the modulated signal according to the burst control signal, at first the switch control circuit 33 instructs the first switch circuit 32 to be switched to the contacts "b" and "b'", for example, at the time t1. At this time, since the modulating circuit 31 conducts the 4-phase PSK operation, the output signal is 100% amplitude-modulated so as to have a moment at which the amplitude becomes zero. Accordingly, generation of spurious frequency spectrum can be suppressed by turning ON and OFF the carrier signal by the second switch circuit 47 or the modulated signal output from the combiner 40 by a switch (not illustrated) on the time at which the amplitude becomes zero.

In FIG. 13, the first switch 32 is explained to be simply formed with the transfer switches but these switches may be formed with a wired logic circuit (not illustrated) built in the logic processing circuit 32 to provide the equivalent function to that of the switches 32.

Figure 14:
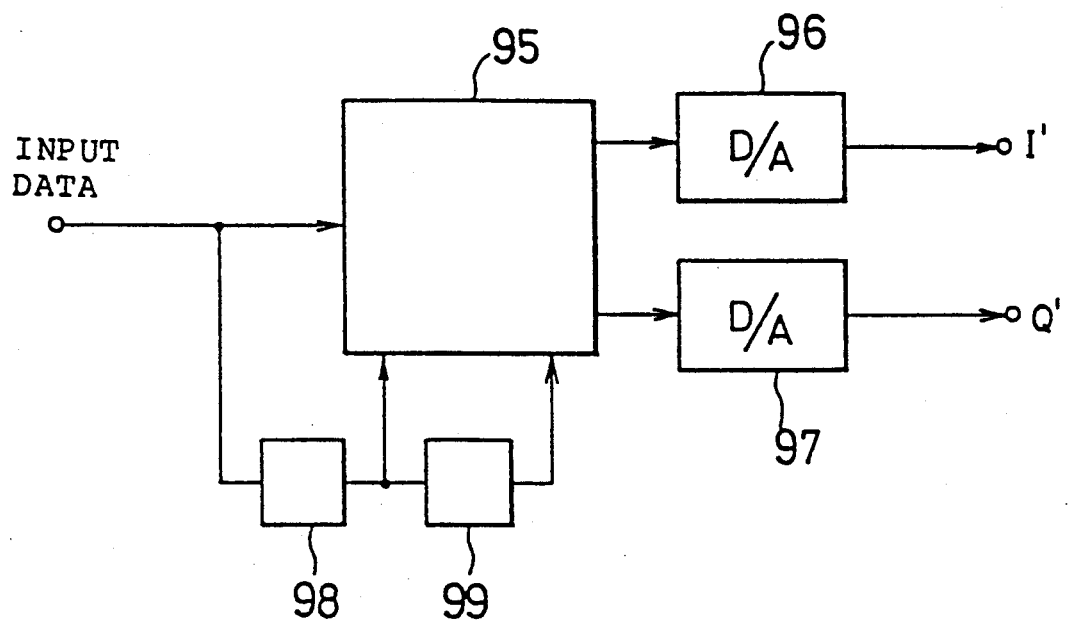
FIG. 14 shows a block diagram of a logic processing circuit employed in the FIG. 13 third preferred embodiment of the present invention.

FIG. 14 is an example of the input signal processing circuit, which has combined the logic processing circuit 35 and the serial/parallel converting circuit 34. In this figure, numeral 95 designates a circuit comprising a serial/parallel converting circuit and a read-only memory (ROM); 96 and 97, digital/analog converters; and 98 and 99, delay circuits. This circuit 95 converts the serially input baseband signal to the parallel signals and is accessed by, tow-bit preceding data, one-bit preceding data, and current data, which are all input as address signals thereto. Thus, the data read out is converted to analog phase signals by D/A converters 96 and 97.

Assuming these phase signals are cos (t) and sin (t), and the carrier wave signal as sin t, the modulated signal:

$$\sin \omega t \cos \phi(t) + \cos \omega t \sin \phi(t) = \sin \{\omega t + \phi(t)\}$$

is output from the modulating circuit 93.

Here, $\phi(t) = mf \cdot \sin \omega_s t$ $\omega_s =$ bit rate $mf =$ modulation index Amplitude of this modulated signal does not become zero at any moment.

Figure 15:
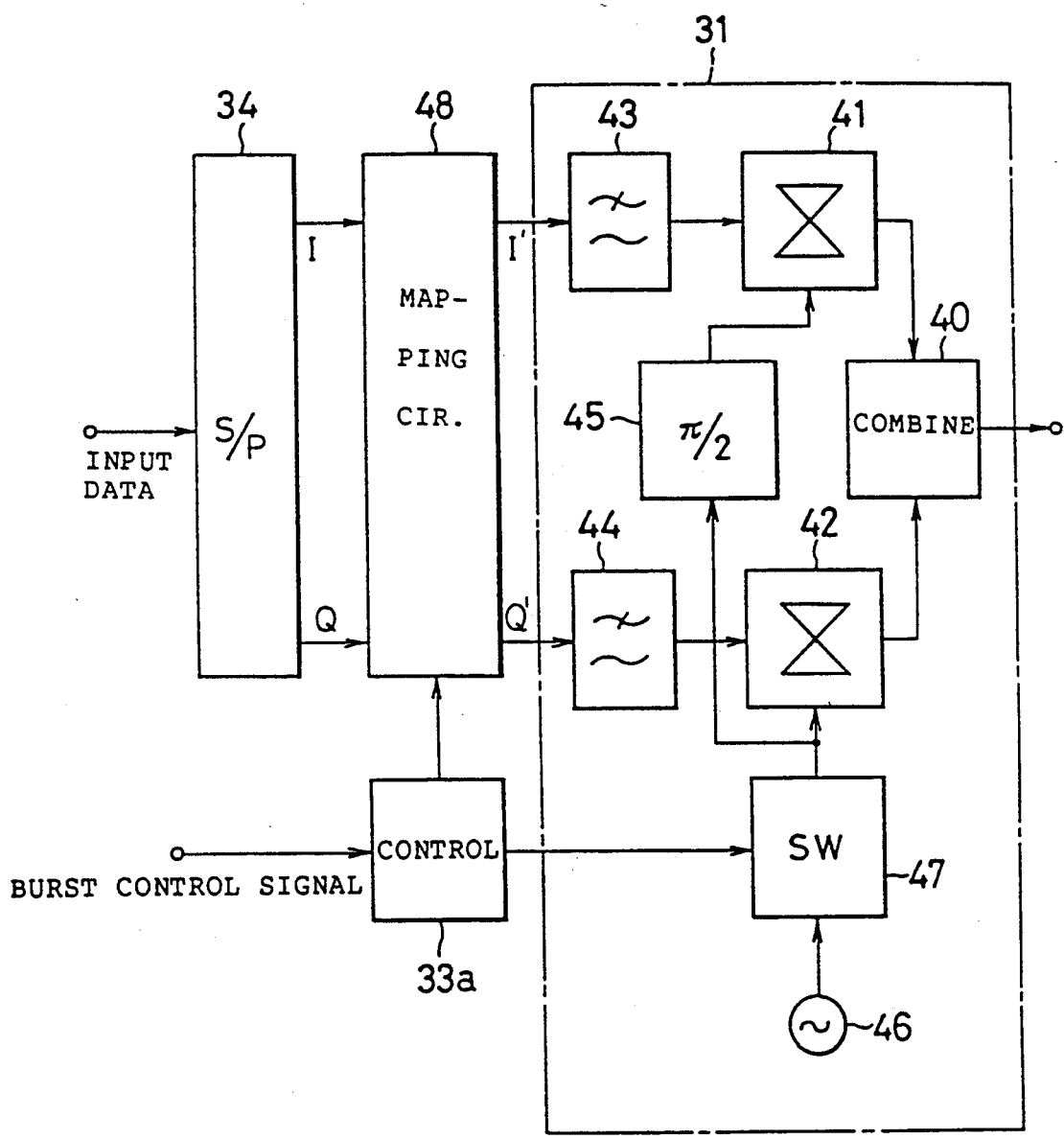
FIG. 15 shows a block diagram of a fourth preferred embodiment of the present invention for operating on the π/4 shift quadrature PSK.
Figure 16:
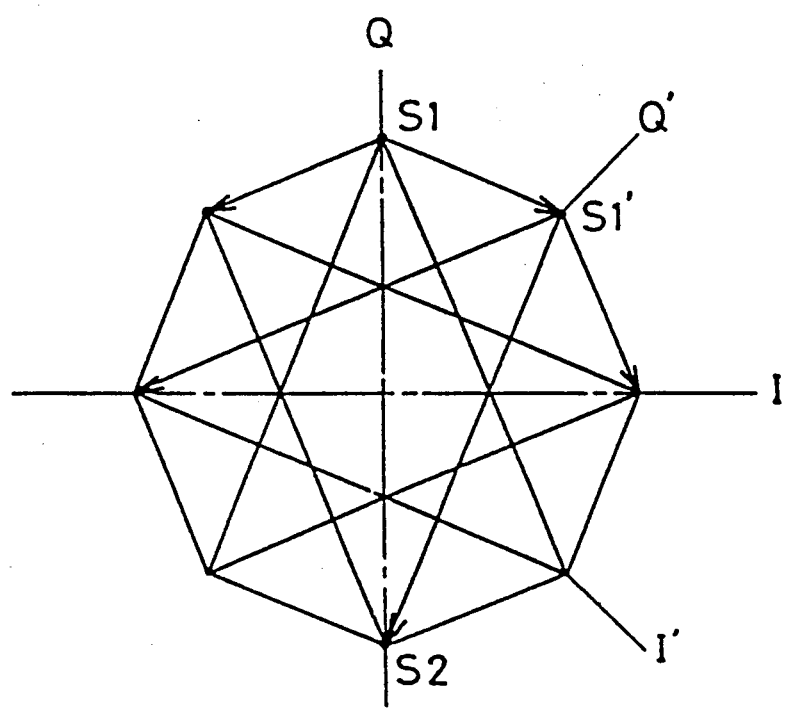
FIG. 16 shows an explanation of the π/4 shift quadrature PSK.
Figure 17:
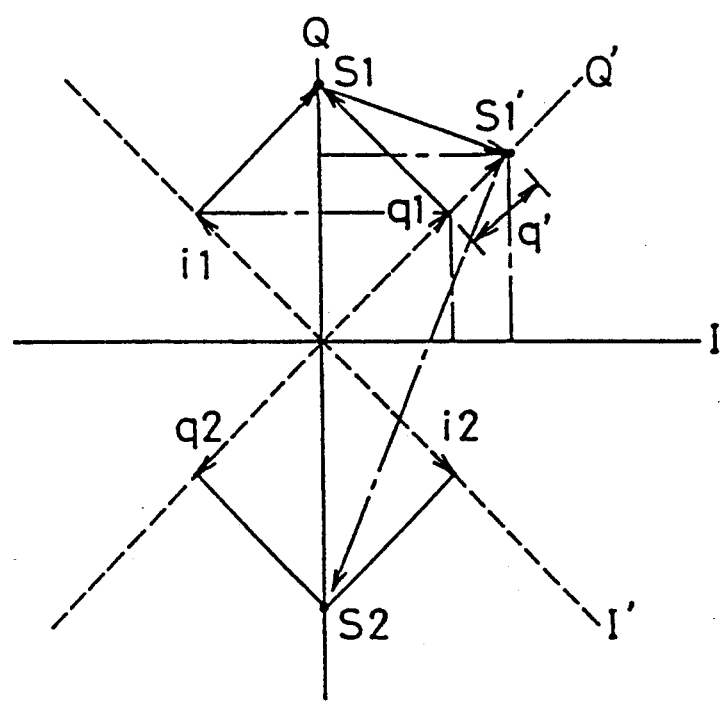
FIG. 17 shows another explanation of the π/4 shift quadrature PSK.

FIG. 15 is a block diagram of a fourth preferred embodiment of the present invention applied to a $\pi/4$ shift QPSK modulation system. In this figure, the numeral 33a designates a switch control circuit and 48, a mapping circuit. The parts like those in FIG. 13 are designated by the like numerals. The mapping circuit 48 processes the respective data of the I and Q channels from the serial/parallel converting circuit 34 and applies thus processed signals I' and Q', as vector signals carrying information of phase and amplitude, to the modulating circuit 31. Thereby, a $\pi/4$ shift QPSK signal can be obtained by the quadrature amplitude modulation in the modulating circuit 31. Such operations will be explained by referring to signal point arrangement in FIG. 16. Namely, when the input signal changes, the signal point on the I or Q axis transfers to the other signal point via the signal points on the I' and Q' axes which have been shifted by $\pi/4$-phase from the I and Q axes. For example, in case the signal is transferred to the signal point S2 from the signal point S1, the phase changes 180 degrees along the Q axis in the PSK system, therefore the modulated signal includes a large amplitude change. However, in the case of the $\pi/4$ shift QPSK system, the signal point once transfers to S1' on the Q' axis from S1 and then transfers to S2. It is also possible to transfer the signal point to S2 via a point on the I' axis. In the case of transferring to the other signal point on the I or Q axis, the signal point transfers to that on the I or Q axis via a signal point on the I' or Q' axis shifted by $\pi/4$ in phase. Therefore, the change of phase is no longer 180 degrees and the modulated signal does not have a moment at which the amplitude becomes zero. Since control is complicated for actual shift of the phase of carrier wave by $\pi/4$, this modulation system using the mapping circuit 48 equivalently processes the data as to shift by $\pi/4$. For example, in FIG. 17, the signal point S1 is equivalent to a combination of i1 and q1 on each axis I and Q. The signal point S1' on the Q' axis can be obtained by providing zero component on the I' axis and providing q1+q' component on the Q' axis. Accordingly, after outputting the sum of each component i1 and q1 on the I' axis and Q' axis during the one bit period, the mapping circuit 48 outputs the q1+q' element on the Q' axis. Thereby, the signal point transfers to S2 from S1 via the signal point S2 and the phase change per each transferring does not become 180 degrees.

FIG. 18 shows a time chart for conceptionally explaining operations of the mapping circuit 48 described above. FIG. 18(a) and FIG. 18(b) respectively show the output signals of the serial/parallel converting circuit 34 in relation to the I and Q axes. The mapping circuit 48 outputs the signal for defining the signal points on the I and Q axis depending on the input data during the former half of the 1 bit period and then outputs the signal for defining the signal points on the I' and Q' axes during the latter half of the 1 bit period. As explained previously, since the $\pi/4$ shift QPSK signal does not have a zero amplitude, spurious wave is generated when the modulated signal is turned ON and OFF. Therefore, in the fourth preferred embodiment of the present invention, the modulating operation in the modulating circuit 31 is switched to the 4-phase PSK operation from the $\pi/4$ shift QPSK modulating operation by controlling the logic operations of the mapping circuit 48 by the control circuit 33a and then inputting the I and Q channel data from the serial/parallel converting circuit 34 directly to the modulating circuit 31. As explained previously, since the 100% amplitude-modulated signal is output from the combiner 40 in the 4-phase PSK operation, the second switch 47 is controlled to turn ON and OFF on such a moment that the amplitude becomes zero, or a switch (not illustrated) provided in series to the output of combiner 40 is ON/OFF-controlled in order to suppress generation of the spurious frequency spectrum.

FIG. 19 is a diagram for explaining the signal points Sa~Sd of the 4-phase PSK. Phase change is 180 degrees between the signal points Sa and Sc, and between the signal points Sb and Sd. Accordingly, a moment at which the amplitude becomes zero exists in the process of the 180 degree phase change. In the $\pi/4$ shift QPSK system described previously, the signal point transfers to Sc from Sa via the point Sa'. Therefore, the 180 degree phase change does not take place on a single transfer of the signal point; accordingly, then, the amplitude does not become zero. As explained above, in the fourth preferred embodiment, the modulating operation having no amplitude change of the modulated signal is at first switched to the modulating operation having 180 degree phase change by which 100% amplitude modulation takes place, and next, the modulated signal is turned OFF and ON at a moment that the amplitude becomes zero. As a result, generation of spurious frequency spectrum due to ON/OFF of the modulated signal can be suppressed. Details of the $\pi/4$-QPSK was disclosed in a report "Noncoherent Detection of $\pi/4$-QPSK System in a CCI-AWGN Combined Interference Environment" by C. C. Liu, et al. at IEEE Vehicle Technology Conference held on May 1-3, 1989.

Figure 20:
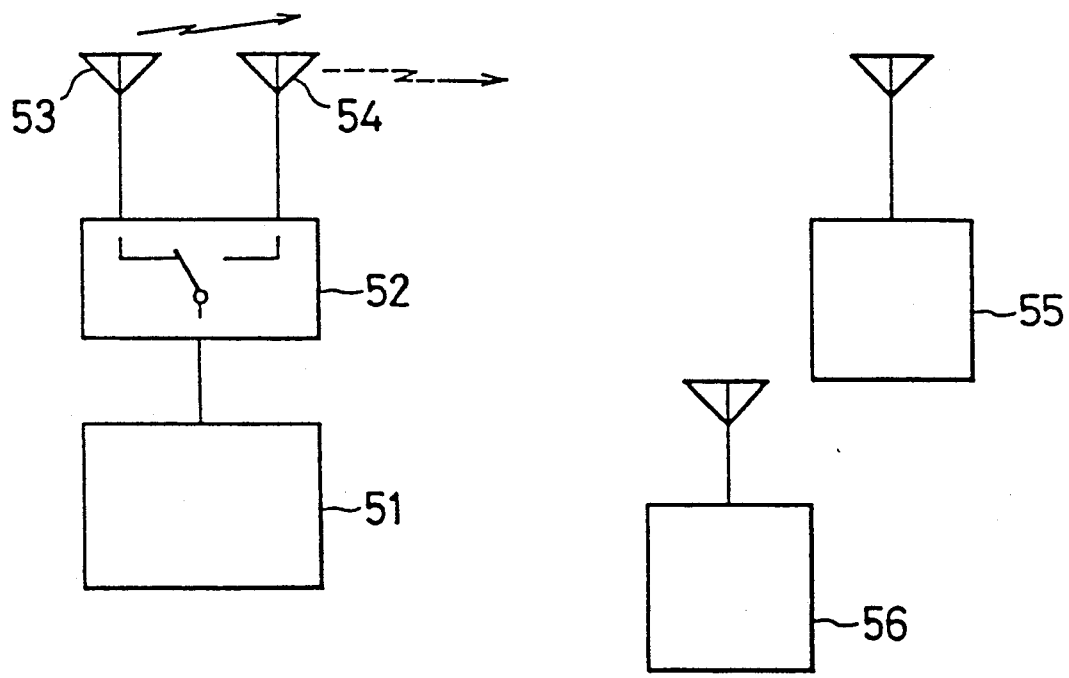
FIG. 20 shows a block diagram of a fifth preferred embodiment of the present invention.

FIG. 20 is a diagram for explaining a fifth preferred embodiment of the present invention. The numeral 51 designates a transmitter of a base station; 52, an antenna switch; 53 and 54, antennas; 55 and 56, some of mobile stations. In an ordinal operation between the base station and the mobile stations, there is employed the offset QPSK modulation system having no moment that the amplitude becomes zero as explained above, and a diversity system is employed where the antennas 53 and 54 are switched to each other at the base station. Even in the service area of the base station, the receiving electric field may become low to deteriorate its error rate in the data communication. A mobile station suffering from such a problem issues a request to the base station to switch the antenna. Then, the base station switches the antenna under operation, for example, 53 to another antenna 54 by controlling the antenna switch 52 in accordance with the request issued from the mobile station 55. Since the base station usually communicates not only with the mobile station 55 but also with the other mobile station 56, it is necessary to make the switching momentarily between the two antennas 53 and 54. However, as explained previously, if the modulated signal is switched during the transmission thereof, the spurious frequency spectrum is generated as explained previously, interfering the other communication systems. Therefore, with an employment of one of circuits of the embodiment mentioned above, the modulating circuit of transmitter 51 is switched to the 100% amplitude modulation or to the 180 degree phase modulation, and then the antenna is switched by the switch 52 at the moment at which the amplitude of modulated signal becomes zero. Thereby, the antenna switching between 53 and 54 can be achieved without generating spurious frequency spectrum. In this case, the guard period G can be as short as 2-3 bit period as explained previously.

Though in the explanation in the above preferred embodiments, the modulator units 21, 22, 41, and 42 are formed, for example, with balanced mixers, it is obvious that any other types of modulator units widely used now can be employed thereto, as long as the function is satisfactorily equivalent to that of the above preferred embodiments.

Though in the above preferred embodiments it is described that interrupt/resume of the modulated wave is carried out on the moment that the amplitude becomes zero, such switching can also be done when the amplitude is not strictly zero. The timing of this switching can be determined compromisingly with the allowable level of the spurious frequency spectrum generated thereby.

The second switch referred to in the above preferred embodiments has been explained as if it is a mechanical switch, however it is also obvious that a switch circuit formed with semiconductor elements or logic circuit may be employed thereto.

The present invention is not limited only to the embodiments explained above and it may apparently be applied to the ON-OFF control of the modulated signal in the other modulation system where the amplitude of the modulated signal does not become zero.

What I claim is:

1. A transmitter comprising:
   a modulator capable of selecting one of two modes of operations depending on types of parallel input signals, in a first mode operation an envelope of an output signal of said modulator never being substantially zero at any instant, in a second mode operation an envelope of said output signal of said modulator being substantially 100% amplitude-modulated or substantially 180 degrees phase-modulated;
   first switch means for switching said types of the parallel input signals, between said first mode operation of said modulator and said second mode operation of said modulator;
   second switch means for interrupting and resuming an output signal of said modulator while said modulator is in said second mode operation; and
   control means for instructing said first and second switch means to operate.

2. A transmitter as recited in claim 1, wherein said control means includes means for controlling said first and second switching means so that after said first mode operation is switched to said second mode operation said output signal is interrupted at a first moment that said envelope of said output signal becomes substantially zero and before said second mode operation is switched to said first mode operation said output signal is resumed at a second moment that said envelope of said output signal is to become substantially zero.

3. A transmitter as recited in claim 1, wherein said modulator comprises a plurality of modulator units and wherein said transmitter further comprises an input signal processing circuit comprising:
   a serial-parallel converting circuit for converting a serial input signal to said parallel input signals; and
   a logic processing circuit for converting said parallel input signals into corresponding phase signals, each of said phase signals being input to a respective one of said modulation units, said first switch means being provided in said input signal processing circuit.

4. A transmitter as recited in claim 1, wherein said first mode operation of the modulator is an offset multi-phase phase-shift keying.

5. A transmitter recited in claim 3, wherein said logic processing circuit comprises a delay circuit which delays one of said parallel input signals by a half bit period, and said first mode operation is an offset four-phase phase-shift keying.

6. A transmitter as recited in claim 5, wherein said first switch means is a switch to disable the signal output from said delay circuit, and said second mode operation is a two-phase phase-shift keying.

7. A transmitter as recited in claim 5, wherein said first switch means is a switch to input one of said phase signals to both of said modulator units, and said second mode operation is a two-phase phase-shift keying.

8. A transmitter as recited in claim 3, wherein said logic processing circuit includes means for converting said parallel input signals to analog signals each carrying frequency shift information and said first mode operation is a frequency shift keying.

9. A transmitter as recited in claim 8, wherein said first switch means comprises switches to bypass said logic processing circuit, and said second mode modulator operation is a four-phase phase-shift keying.

10. A transmitter as recited in claim 3, wherein said logic processing circuit is a mapping circuit including means for converting said parallel input signals to vector signals carrying phase and amplitude information, whereby said first mode operation is a $\pi/4$-shift quadrature phase-shift keying modulator.

11. A transmitter as recited in claim 10, wherein said first switching means includes means for bypassing said mapping circuit and said second mode operation is a four-phase phase-shift keying.

12. A transmitter recited in claim 3, wherein said second switch means is constituted with logic operation of said logic processing circuit.

13. A transmitter as recited in claim 1, further comprising:
   a logic processing circuit for converting said parallel input signals into corresponding phase signals; and
   wherein said second mode operation is a four-phase phase-shift keying.

14. A transmitter as recited in claim 1, wherein said modulator comprises:
   a local frequency oscillator coupled to said switch means; and
   a plurality of modulation units coupled to said switch means, and
   wherein said second switch means comprises a switch provided between said local frequency oscillator and said modulation units in said modulator.

15. A transmitter as recited in claim 1, wherein:
said modulator comprises an output circuit; and said second switch means comprises a switch provided in series to said output circuit of said modulator.

16. A transmitter as recited in claim 1, wherein said modulator comprises:
- a local frequency oscillator producing a local frequency oscillation signal;
- a phase shifter for delaying the local frequency oscillation signal by $\pi/2$ of its phase and outputting a delayed local frequency oscillation signal;
- a first low-pass filter receiving a first parallel input signal converted from a serial input signal to be transmitted and producing an output;
- a first modulator unit, receiving the output of said first low-pass filter, for modulating said delayed local frequency oscillation signal with the output from said first low-pass filter;
- a second low-pass filter receiving a second parallel input signal and producing an output;
- a second modulator unit receivng the output of said second low-pass filter, for modulating the local frequency oscillation signal with the output from said second low-pass signal to produce an output; and
- a combiner for summing the outputs of said first modulator unit and said second modulator unit.

17. A transmitter as recited in claim 16, wherein each of said first and second modulator units comprises a balanced mixer coupled to said first and second low-pass filter, respectively.

18. A method of switching operational modes of a transmitter having a modulator capable of selecting one of two modes of operation depending on types of parallel input signals, in a first mode operation an envelope of an output signal of the modulator never being substantially zero at any instant, in a second mode operation said envelope of said output signal of the modulator being substantially 100% amplitude-modulated or substantially 180 degrees phase-modulated, a first switch unit for switching the types of the parallel input signals, between said first mode operation of the modulator and said second mode operation of the modulator, and a second switch unit for interrupting and resuming said output signal of the modulator while the modulator is in said second mode operation, said method comprising the steps of:
(a) switching said first mode operation to said second mode operation;
(b) interrupting said output signal of the modulator;
(c) resuming said output singal interrupted in step (b); and
(d) switching said second mode operation to said first mode operation.

19. A method of switching operational modes of a transmitter as recited in claim 18, wherein said interrupting of said output signal is at a first moment that said envelope of said output signal becomes substantially zero.

20. A method of switching operational modes of a transmitter as recited in claim 19, wherein said resuming of said output signal is at a second moment when said envelope of said output signal is to become substantially zero.

21. A method of switching antennas of a transmitting station having a plurality of antennas and a transmitter including a modulator capable of selecting one of two modes of operation depending on types of parallel input signals, in a first mode operation an envelope of an output signal of the modulator never being substantially zero at any instant, in a second mode operation said envelope of said output signal of the modulator being substantially 100% amplitude-modulated or substantially 180 degrees phase-modulated, a first switch unit for switching said types of the parallel input signals, between said first mode operation of the modulator and said second mode operation of the modulator, and a second switch unit for interrupting and resuming an output signal of the modulator while the modulator is in said second mode operation, said method comprising the steps of:
(a) switching said first mode operation to said second mode operation;
(b) interrupting said output signal of the modulator at a first moment that said envelope of said output signal becomes substantially zero;
(c) switching an operational connection of said transmitter, from one of said antennas to another antenna;
(d) resuming said output signal interrupted in step (b) at a second moment that said envelope of said output signal is to become substantially zero; and
(e) switching said second mode operation to said first mode operation.

22. A transmitting station comprising:
a plurality of antennas; and
a transmitter comprising:
- a modulator capable of selecting one of two modes of operations depending on types of parallel input signals, in a first mode operation an envelope of an output signal of said modulator never being substantially zero at any instant, in a second mode operation said envelope of said output signal of said modulator being substantially 100% amplitude-modulated or substantially 180 degrees phase-modulated;
- first switch means for switching said types of the parallel input signals, between said first mode operation of said modulator and said second mode operation of said modulator;
- second switch means for interrupting and resuming an output signal of said modulator while said modulator is in said second mode operation;
- an antenna switch for operatively connecting said transmitter to one of said antennas; and
- control means for instructing said first and second switch means, and said antenna switch to sequentially (1) switch said first mode operation to said second mode operation; (2) interrupt said output signal at a first moment that said envelope of said output signal becomes substantially zero; (3) switch an operational connection of said transmitter, from one of said antennas to another of said antennas; (4) resume said interrupted output signal at a second moment that said envelope of said output signal is to become substantially zero; and (5) switch said second mode operation to said first mode operation.

* * * * *

UNITED STATES PATENT AND TRADEMARK OFFICE
CERTIFICATE OF CORRECTION

PATENT NO. : 5,193,222
DATED : March 9, 1993
INVENTOR(S) : Susumu SASAKI

It is certified that error appears in the above-indentified patent and that said Letters Patent is hereby corrected as shown below:

\*     Col. 1,     line 38,     change "in stead" to --instead--.

\*     Col. 5,     line 30,     change "In stead" to --Instead--.

\*     Col. 7,     line 41,     change "in stead" to --instead--.

\*     Col. 8,     line 62,     change "tow-bit" to --two-bit--.

Col. 9,     line 46,     change "i1 and q1" to --I1 and Q1--.

Col. 13,     line 20,     change "receivng" to --receiving--.

Signed and Sealed this

Fifth Day of April, 1994

Attest:

BRUCE LEHMAN

*Attesting Officer*      *Commissioner of Patents and Trademarks*